US011235679B2

(12) United States Patent
Ogawa

(10) Patent No.: US 11,235,679 B2
(45) Date of Patent: Feb. 1, 2022

(54) POWER CONTROL DEVICE

(71) Applicant: HONDA MOTOR CO., LTD., Tokyo (JP)

(72) Inventor: Makoto Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 16/815,512

(22) Filed: Mar. 11, 2020

(65) Prior Publication Data

US 2020/0290475 A1    Sep. 17, 2020

(30) Foreign Application Priority Data

Mar. 15, 2019   (JP) .............................. JP2019-048701

(51) Int. Cl.
*B60L 53/63*    (2019.01)
*H02J 7/00*     (2006.01)

(52) U.S. Cl.
CPC .......... *B60L 53/63* (2019.02); *H02J 7/00304* (2020.01); *B60L 2210/10* (2013.01); *B60L 2210/30* (2013.01)

(58) Field of Classification Search
CPC .. B60L 53/63; B60L 2210/10; B60L 2210/30; H02J 7/00304
USPC ........................................................ 320/162
See application file for complete search history.

(56) References Cited

U.S. PATENT DOCUMENTS

| 8,742,718 B2* | 6/2014 | Sugiyama et al. ...... B60L 53/14 320/104 |
| 9,014,891 B2* | 4/2015 | Takayanagi et al. . B60W 20/10 701/22 |
| 10,189,358 B2* | 1/2019 | Mitsutani ................ B60L 53/24 |
| 2018/0358837 A1 | 12/2018 | Sakakibara et al. |

FOREIGN PATENT DOCUMENTS

| EP | 2 204 894 A1 | 7/2010 |
| JP | 6242006 | 11/2017 |

OTHER PUBLICATIONS

European Search Report dated Aug. 12, 2020, English text, 7 pages.

* cited by examiner

*Primary Examiner* — Sun J Lin
(74) *Attorney, Agent, or Firm* — Rankin, Hill & Clark LLP

(57) ABSTRACT

A power control device that can charge a battery by controlling an output of a conversion unit configured to convert a supplied grid electric power into an electric power for charging the battery, the power control device includes: a sensing unit configured to sense voltage and current of the supplied grid electric power; a determination unit configured to determine whether a sensed voltage sensed by the sensing unit is in an unstable state in which the sensed voltage drops relative to a rated voltage of the supplied grid electric power; a calculation unit configured to calculate an allowable power value based on the sensed voltage and a rated current of the supplied grid electric power in a case when the determination unit determines that the sensed voltage is in the unstable state; and a control unit configured to control the output of the conversion unit based on the allowable power value.

5 Claims, 5 Drawing Sheets

POWER CONTROL DEVICE

CROSS-REFERENCE TO RELATED APPLICATION(S)

This application claims priority to and the benefit of Japanese Patent Application No. 2019-048701 filed on Mar. 15, 2019, the entire disclosure of which is incorporated herein by reference.

BACKGROUND OF THE INVENTION

Field of the Invention

The present invention relates to a power control device.

Description of the Related Art

As a charging device for electric vehicle used for charging an on-board battery, Japanese Patent No. 6242006 discloses a device that can charge an on-board battery with grid electric power and electric power generated by a photovoltaic power generator. It is known that a device that charges an on-board battery monitors charge current with its current detection unit and has a charge-discharge stop function for overcurrent protection in a case where the charge current exceeds an allowable current of the device.

However, the grid electric power can be unstable in some areas or periods of time of electric power supply. When rated charging on an on-board battery is started in a period of time or an area in which grid electric power can be unstable, there can be a case where a drop in grid power voltage causes a charge current necessary for the charging at a normal rated power to exceed an allowable current, becoming an overcurrent, which is detected and results in stop of the charging. In this case, a manual restart of the charging becomes necessary.

The present invention provides a technique that can perform charging continuously while avoiding charge stop due to an overcurrent.

SUMMARY OF THE INVENTION

According to one aspect of the present invention, there is provided a power control device that can charge a battery by controlling output of a conversion unit configured to convert supplied grid electric power into electric power for charging, the power control device comprising: a sensing unit configured to sense voltage and current of the grid electric power; a determination unit configured to determine whether a sensed voltage sensed by the sensing unit is in an unstable state in which the sensed voltage drops relative to a rated voltage of the grid electric power; a calculation unit configured to calculate an allowable power value based on the sensed voltage and a rated current of the grid electric power in a case where the determination unit determines that the sensed voltage is in the unstable state; and a control unit configured to control the output of the conversion unit based on the allowable power value.

According to the present invention, a technique that enables charging to be performed continuously while avoiding charge stop due to an overcurrent can be provided.

DESCRIPTION OF THE EMBODIMENTS

Figure 1:
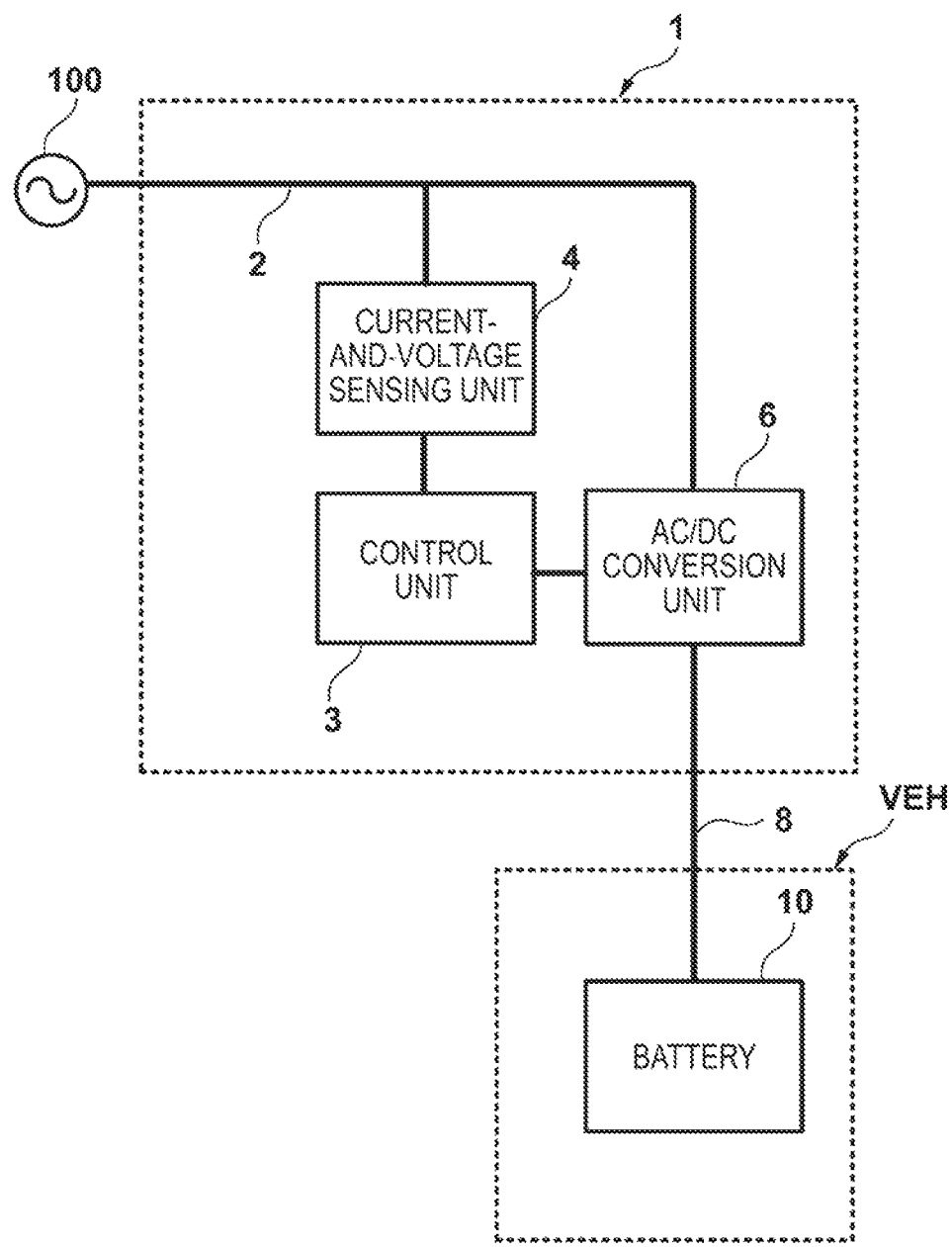
FIG. 1 is a block diagram illustrating a functional configuration of a power control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration of Device)

FIG. 1 is a block diagram illustrating a functional configuration of a power control device 1 according to an embodiment of the present invention. The diagram illustrates an example in which the power control device 1 charges an on-board battery 10 of a vehicle VEH. The vehicle VEH is, for example, an electric vehicle (EV) or a plug-in hybrid vehicle (PHEV), and the battery 10 is, for example, a lithium ion battery.

The power control device 1 can charge the battery 10 while controlling output of a conversion unit (e.g., AC/DC conversion unit 6) that converts supplied grid electric power into electric power for charging. The power control device 1 can constitute, for example, a commercial electric power management device installed in a charging station or an electric power management device installed in a house. The power control device 1 is connected to an electric power line 2 that is supplied with AC power from an electric power system 100 being electric power supply facilities of an electric power company or the like (grid electric power).

The power control device 1 includes a current-and-voltage sensing unit 4. Here, the current-and-voltage sensing unit 4 senses voltage and current of the grid electric power. For example, the current-and-voltage sensing unit 4 is a sensor that senses a physical quantity relating to the grid electric power supplied from the electric power line 2, and in the present embodiment, the current-and-voltage sensing unit 4 includes a sensor that measures AC voltage and a sensor that measures current.

The power control device 1 includes the AC/DC conversion unit 6, and the AC/DC conversion unit 6 converts the AC power supplied from the electric power line 2 (grid electric power) into DC power for charging.

The power control device 1 includes a control unit 3, and the control unit 3 includes a processor, typically a CPU, a storage device such as a semiconductor memory, an input-output interface for an external device, a communication interface, and the like. The storage device stores a program to be executed by the processor, data to be used by the processor for processing, and the like.

The control unit 3 is connected to the AC/DC conversion unit 6 and the current-and-voltage sensing unit 4 and determines, based on an AC voltage sensed by the current-and-voltage sensing unit 4 (sensed voltage), whether a rated voltage of the grid electric power (rated grid power voltage) has dropped. If the sensed AC voltage (sensed voltage) has dropped by a predetermined voltage value or more, the control unit 3 determines that the grid power voltage is in an unstable state.

In the unstable state of the grid power voltage, the control unit 3 determines whether a current exceeding a threshold current (overcurrent) has occurred. Based on information on the current and information on the voltage sensed by the current-and-voltage sensing unit 4 (current information and voltage information), the control unit 3 calculates an allowable current value and an allowable power value and, based on the calculated allowable power value, controls the output of the AC/DC conversion unit 6 to perform charging based on an electric power value to which the normal rated power is reduced by an electric power value (restricted charging).

Example of Processing Before Starting Restricted Charging

Figure 2:
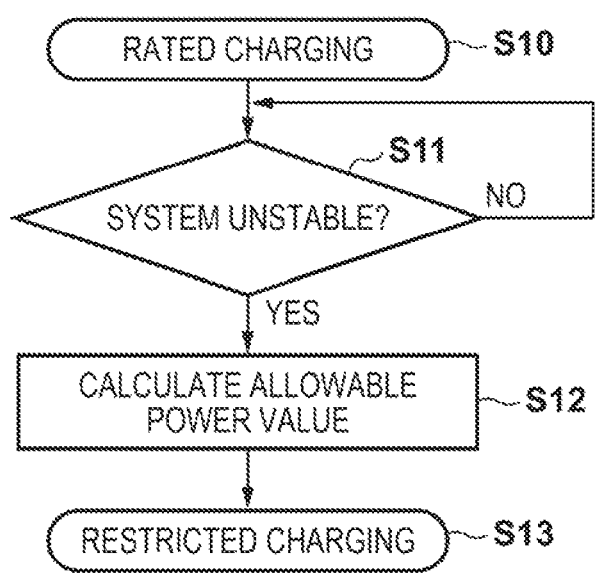
FIG. 2 is a flowchart of an example of processing performed by a control unit of the power control device.

FIG. 2 is a flowchart used for describing a process flow before starting the restricted charging to be performed by the power control device 1. Receiving a charging request, with a charging cable 8 connected to the vehicle VEH, the control unit 3 performs the following processing.

In step S10, in response to the charging request, the control unit 3 gives a command to start charging at the normal rated power (rated charging command). Here, the charging is started with the AC power from the electric power system 100 being 5.5 KW (200 VAC, 27.5 A), as an example of rated charging.

In step S11, based on a sensing result from the current-and-voltage sensing unit 4, the control unit 3 determines whether the electric power system 100 is unstable. In a case of a drop in the AC voltage of the electric power line 2 from 200 V (rated grid power voltage), which is sensed by the current-and-voltage sensing unit 4, by a predetermined voltage value or more, for example, in a case of a drop from 200 VAC to 190 VAC (S11—Yes), the control unit 3 proceeds the processing to step S12.

In contrast, in a case where the determination process in step S11 results in a determination that the grid power voltage is not unstable (S11—No), the control unit 3 returns the process to repeat the same processing to monitor the state of the grid power voltage.

In step S12, based on a sensing result from the current-and-voltage sensing unit 4, the control unit 3 acquires the current information and the voltage information and calculates the allowable current value and the allowable power value. In a case where the determination process in step S11 results in a determination that the grid power voltage is in an unstable state, the control unit 3 calculates the allowable power value based on the sensed voltage sensed by the current-and-voltage sensing unit 4 and the rated current of the grid electric power. For example, based on a voltage value of the electric power line 2 sensed by the current-and-voltage sensing unit 4 (sensed voltage: 190 VAC) and the rated current of the grid electric power (27.5 A), the control unit 3 acquires an allowable power value of 5.3 kW (=190 V×27.5 A).

Here, in the process of calculating the allowable current value and the allowable power value, the control unit 3 determines whether an overcurrent exceeding the threshold current has been sensed. In a case where the AC power from the electric power system 100 is 5.5 kW, and the sensed voltage of the electric power line 2 is 190 VAC, the current is 28.9 A. Assuming that the threshold current is, for example, 30 A, the current in the unstable state of the grid power voltage (28.9 A) does not exceed the threshold current (30 A), and thus the control unit 3 determines that no overcurrent has occurred in the unstable state of the grid power voltage.

Then, in step S13, the control unit 3 controls the output of the AC/DC conversion unit 6 so as to perform the charging based on the calculated allowable power value. That is, the control unit 3 controls the output of the AC/DC conversion unit 6 so as to perform the charging based on the electric power value to which the normal rated power is reduced by an electric power value (restricted charging).

Example of Processing After Starting Restricted Charging

Figure 3:
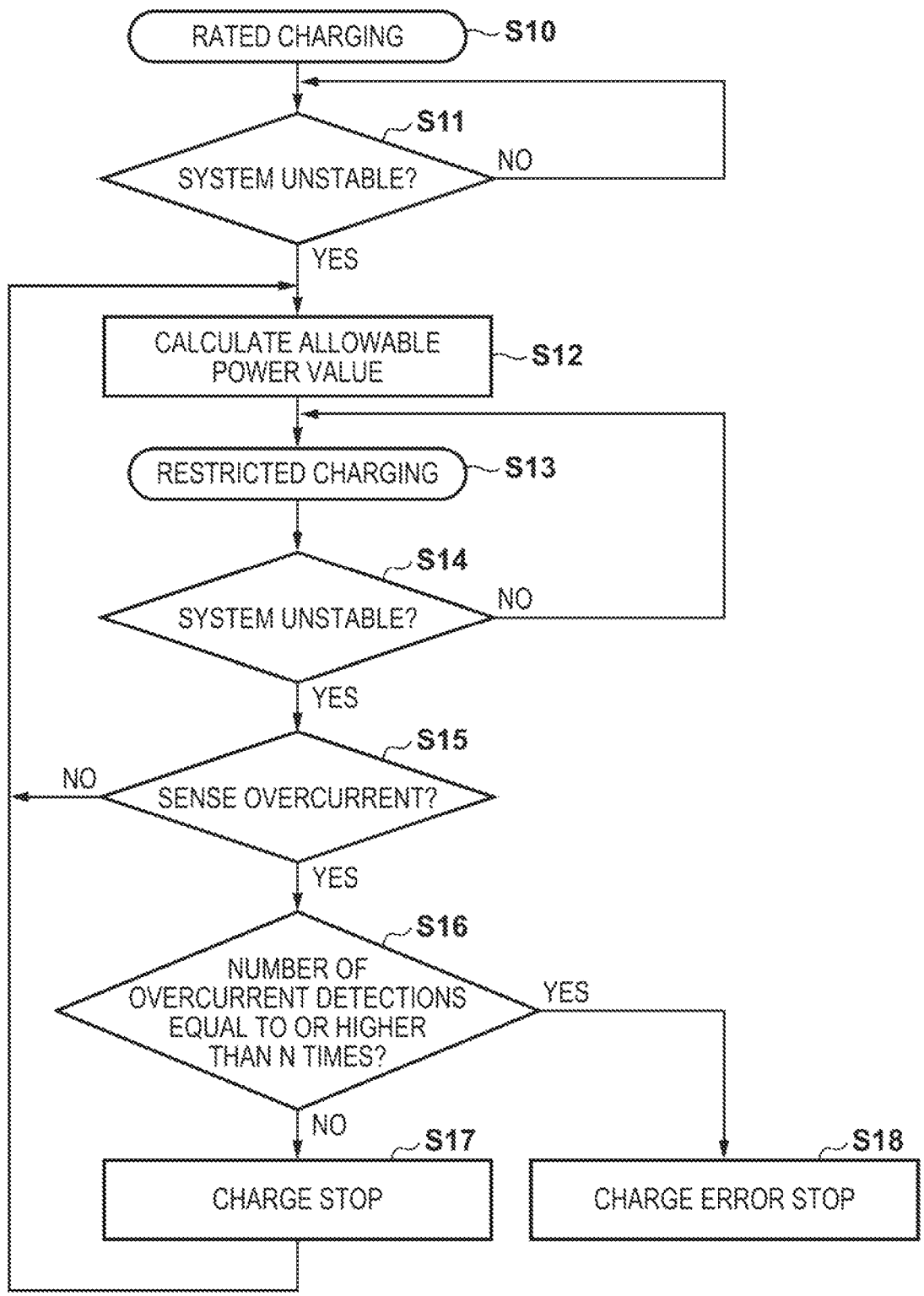
FIG. 3 is a flowchart of an example of processing performed by the control unit of the power control device.

Next, a process flow after starting the restricted charging will be described. FIG. 3 is a flowchart used for describing the process flow after starting the restricted charging performed by the power control device 1. Processes of steps S10 to S13 are the same as those illustrated in FIG. 2.

In step S14, based on a sensing result from the current-and-voltage sensing unit 4, the control unit 3 determines whether the electric power system 100 is unstable in a restricted charging state. In a case of a drop in the AC voltage of the electric power line 2 from 190 V, which is sensed by the current-and-voltage sensing unit 4, by a predetermined voltage value or more, for example, in a case of a drop from 190 VAC to 170 VAC (S14—Yes), the control unit 3 proceeds the processing to step S15.

In contrast, in a case where the determination process in step S14 results in a determination that the grid power voltage is not unstable (S14—No), the control unit 3 returns the process to repeat the same processing to monitor the state of the grid power voltage. The control unit 3 controls the output of the AC/DC conversion unit 6 so as to continue the restricted charging of step S13.

In step S15, the control unit 3 determines whether an overcurrent exceeding the threshold current has been sensed. The control unit 3 further determines whether a current in a case where the charging is performed with the sensed voltage sensed in the unstable state and the electric power value of the grid electric power is an overcurrent equal to or higher than the threshold current. In a case where the determination process in step S15 results in a determination that no overcurrent has occurred (S15—No), the control unit 3 returns the processing to step S12, and by performing the same processes, the control unit 3 acquires the current information and the voltage information based on a sensing result from the current-and-voltage sensing unit 4 and calculates the allowable current value and the allowable power value.

In contrast, in a case where the determination process in step S15 indicates that the electric power value of the grid electric power is 5.3 kW, and the sensed voltage of the electric power line 2 is 170 VAC, in the restricted charging from the electric power system 100, the current is 31.2 A. In this case, the current in the unstable state of the grid power voltage (31.2 A) exceeds the threshold current (30 A), and thus the control unit 3 determines that an overcurrent has occurred in the unstable state of the grid power voltage (S15—Yes) and proceeds the processing to step S16.

In step S16, the control unit 3 accumulates consecutive number of times the current is determined to be an overcurrent equal to or higher than the threshold current, and when the accumulated number of times becomes not less than a threshold number of times, the control unit 3 performs control such that the output of the conversion unit is error-stopped. The control unit 3 counts up a number of consecutive detections m of overcurrent. For example, when the number of consecutive detections of overcurrent is one, the control unit 3 sets m as m=1, and when the number of consecutive detections of overcurrent is two, the control unit 3 sets m as m=2. Here, let N denote an error-stop number of consecutive detections (threshold number of times). The control unit 3 compares an accumulated number of consecutive detections (m) with the error-stop number of consecutive detections (threshold number of times: N), and in a case where the accumulated number (m) is not less than the error-stop number of consecutive detections (threshold number of times: N) (m≥N: S16—Yes), the control unit 3 proceeds the processing to step 18.

In step S18, the power control device 1 is subjected to charge error stop. In a case where the accumulated number of consecutive detections of overcurrent (m) becomes not less than the error-stop number of consecutive detections (threshold number of times: N), the control unit 3 performs control such that the output of the AC/DC conversion unit 6 is stopped because there is a possibility of a system abnormality in the electric power system 100 or a failure of the power control device 1.

In contrast, in a case where the determination process in step S16 results in a determination that the accumulated number of consecutive detections of overcurrent (m) is less than the error-stop number of consecutive detections (threshold number of times: N) (m<N: S16—No), the control unit 3 proceeds the processing to step S17.

In step S17, when determining in the preceding step S15 that an overcurrent has occurred, the control unit 3 performs control such that the output of the AC/DC conversion unit 6 is stopped until the allowable power value is recalculated in the process of step S12 performed next time. In this step, to protect the battery 10 to be charged, the control unit 3 performs control such that the output of the AC/DC conversion unit 6 is stopped so that the charging is stopped until the process of recalculating the allowable power value is completed in step S12 (charge stop), and the control unit 3 returns the processing to step S12.

In step S12, the control unit 3 recalculates the allowable power value in a state where a value of the grid power voltage further drops (e.g., a state where the value drops from 190 VAC to 170 VAC). Based on a sensing result from the current-and-voltage sensing unit 4, the control unit 3 acquires the current information and the voltage information and calculates the allowable current value and the allowable power value. That is, based on a voltage value of the electric power line 2 sensed by the current-and-voltage sensing unit 4 (170 VAC) and a rated current value (27.5 A), the control unit 3 acquires an allowable power value of 4.7 kW (=170 V×27.5 A).

Then, in step S13, the control unit 3 releases the state of charge stop (S17) and resumes the restricted charging. In this step, after the allowable power value is calculated in step S12, the control unit 3 performs control such that the output of the AC/DC conversion unit 6 is resumed based on the calculated allowable power value. Here, the control unit 3 controls the output of the AC/DC conversion unit 6 so as to perform the charging based on the allowable power value calculated in step S12. That is, the control unit 3 controls the output of the AC/DC conversion unit 6 so as to perform the charging based on an electric power value (4.7 kW) to which the normal rated power (5.5 kW) is further reduced (restricted charging).

Subsequently, the power control device 1 repeats the processes of step S14 and its subsequent steps in the same manner until a predetermined electric power is charged to the battery 10.

Other Embodiments

Figure 4:
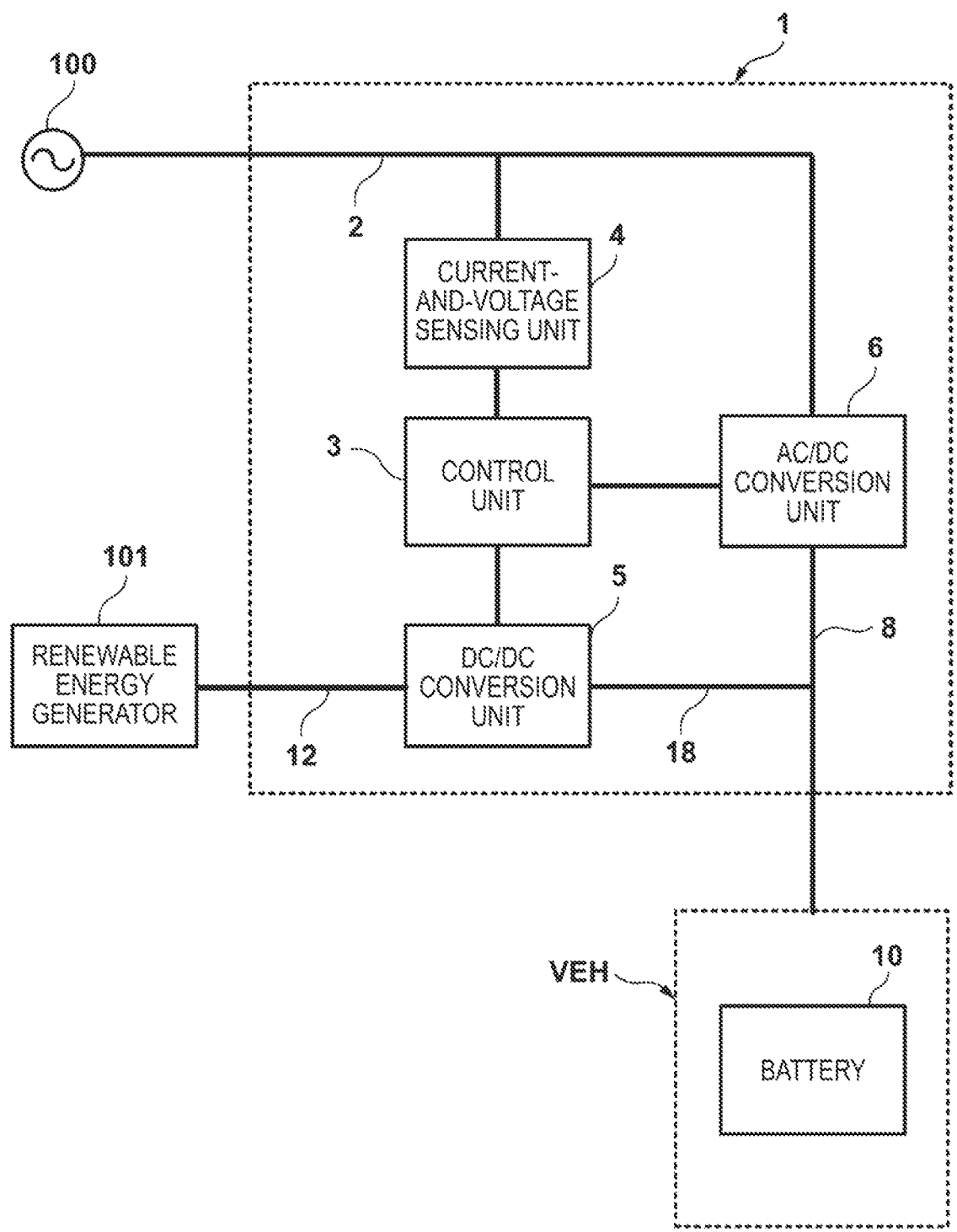
FIG. 4 is a block diagram illustrating a functional configuration of a power control device according to another embodiment.

In the embodiment of the power control device described with reference to FIG. 1, the power control device 1 is described as a device that can be fed with electric power from the electric power system 100, but the power control device 1 is not limited to this example and can be connected to a renewable energy generator 101 such as a photovoltaic power generator and a wind turbine generator, as illustrated in FIG. 4. In this embodiment, the power control device 1 includes a DC/DC conversion unit 5, and the DC/DC conversion unit 5 can be connected to the renewable energy generator 101 through an electric power line 12. The DC/DC conversion unit 5 converts DC power generated by the renewable energy generator 101 into a predetermined DC power and outputs the predetermined DC power to an electric power line 18, under the control by the control unit 3. The battery 10 is charged with electric power combined of the electric power output from the AC/DC conversion unit 6 and the electric power output from the DC/DC conversion unit 5.

Also in a configuration illustrated in FIG. 4, the processing illustrated in FIG. 2 and FIG. 3 is to be performed in the unstable state of the voltage value of the electric power of the electric power system 100 (grid electric power), which is described in the above embodiment.

Figure 5:
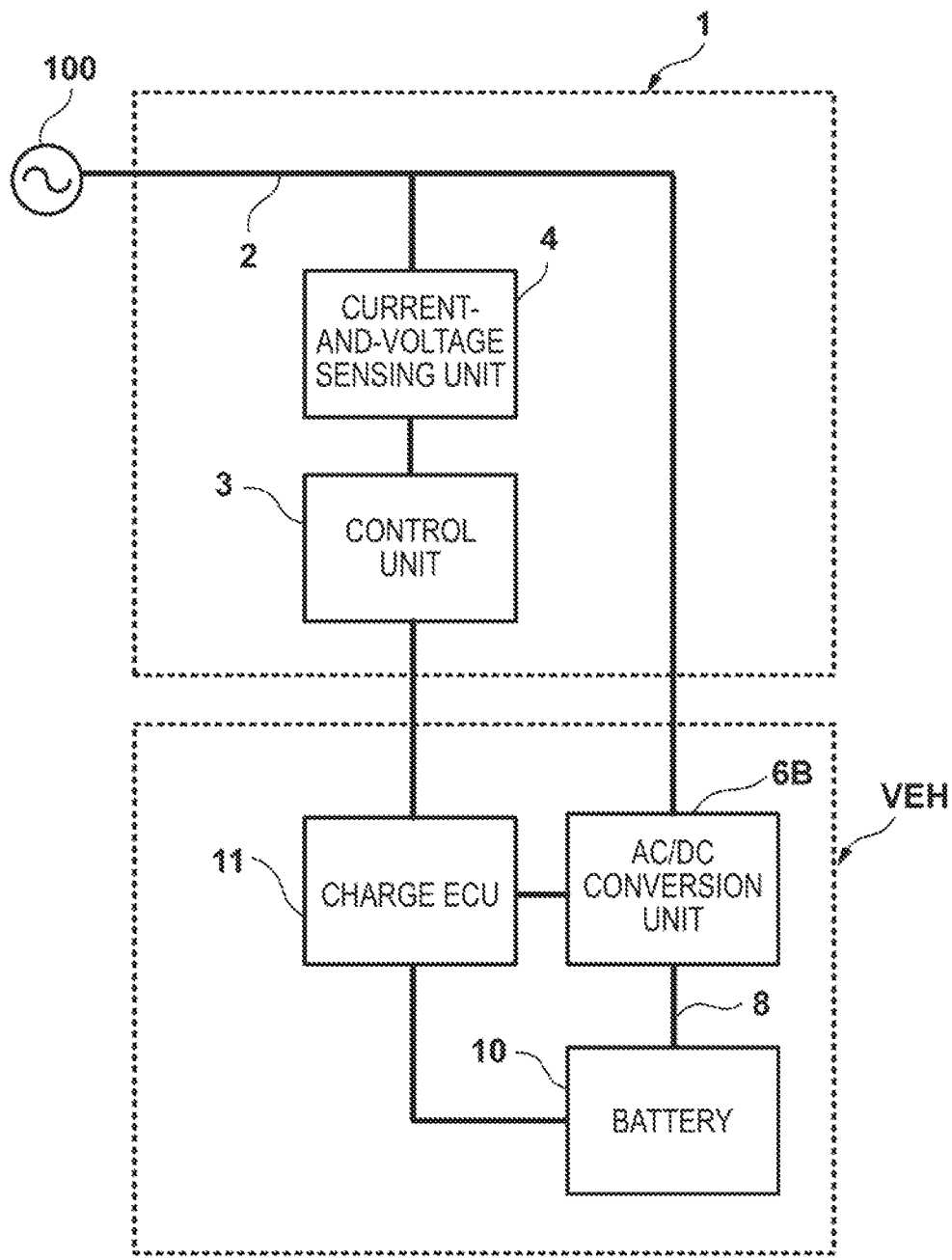
FIG. 5 is a block diagram illustrating a functional configuration of a power control device according to still another embodiment.

In the embodiment of the power control device described with reference to FIG. 1, the configuration in which the power control device 1 includes a charger (the AC/DC conversion unit 6) is described, but the power control device 1 is not limited to this example and can be configured to charge the battery 10 using a charger provided in the vehicle VEH (an AC/DC conversion unit 6B), as illustrated in FIG. 5. In this case, the control unit 3 of the power control device 1 is to communicate data with a charge ECU 11 provided in the vehicle VEH, and the control unit 3 and the charge ECU 11 are to collaborate with each other to control output of the charger (AC/DC conversion unit 6B).

For example, the control unit 3 of the power control device 1 determines whether the sensed voltage sensed by the current-and-voltage sensing unit 4 is in an unstable state in which the sensed voltage has dropped relative to the rated voltage of the grid electric power, and when determining that the sensed voltage is in the unstable state, the control unit 3 calculates the allowable power value based on the sensed voltage and the rated current of the grid electric power. Then, the charge ECU 11 of the vehicle VEH is to control the output of the AC/DC conversion unit 6B based on the allowable power value calculated by the control unit 3.

Summary of Embodiment

The embodiment discloses at least the following configurations.

Configuration 1. The power control device in the embodiment is a power control device (e.g., 1 illustrated in FIG. 1) that can charge a battery (e.g., 10 illustrated in FIG. 1) by controlling output of a conversion unit (e.g., the AC/DC conversion unit 6 illustrated in FIG. 1) that converts supplied grid electric power into electric power for charging, the power control device including:

a sensing unit (e.g., the current-and-voltage sensing unit 4) configured to sense voltage and current of the grid electric power;

a determination unit (e.g., the control unit 3 illustrated in FIG. 1, S11 illustrated in FIG. 2) configured to determine whether a sensed voltage sensed by the sensing unit is in an unstable state in which the sensed voltage drops relative to a rated voltage of the grid electric power;

a calculation unit (e.g., the control unit 3 illustrated in FIG. 1, S12 illustrated in FIG. 2) configured to calculate an allowable power value based on the sensed voltage and the rated current of the grid electric power in a case where the determination unit determines that the sensed voltage is in the unstable state; and a control unit (e.g., the control unit 3 illustrated in FIG. 1, S13 illustrated in FIG. 2) configured to control output of the conversion unit based on the allowable power value.

The power control device having Configuration 1 makes it possible to provide a technique that enables charging to be performed continuously while avoiding charge stop due to an overcurrent.

Configuration 2. In the power control device in the embodiment, the determination unit (e.g., the control unit 3 illustrated in FIG. 1, S15 illustrated in FIG. 3) further determines whether a current in a case where charging is performed with the sensed voltage sensed in the unstable state and the electric power value of the grid electric power is an overcurrent equal to or higher than the threshold current.

The power control device having Configuration 2 makes it possible to provide a technique that enables charging to be performed continuously while avoiding charge stop due to an overcurrent by monitoring whether the current is an overcurrent in the unstable state.

Configuration 3. In the power control device in the embodiment, in a case where the determination unit (e.g., the control unit 3 illustrated in FIG. 1, S15—Yes illustrated in FIG. 3) determines that the current is an overcurrent equal to or higher than the threshold current, the control unit (e.g., the control unit 3 illustrated in FIG. 1, S17 illustrated in FIG. 3) performs control such that the output of the conversion unit is stopped until the calculation unit calculates the allowable power value.

The power control device having Configuration 3 makes it possible that, in a case where an overcurrent is detected, the control unit performs control such that the output of the conversion unit is stopped so that the charging is stopped until the process of calculating the allowable power value is completed, by which the battery to be charged can be protected.

Configuration 4. In the power control device in the embodiment, after the calculation unit calculates the allowable power value, the control unit (e.g., the control unit 3 illustrated in FIG. 1, and S17, S12, and S13 illustrated in FIG. 3) performs control such that the output of the conversion unit is resumed based on the calculated allowable power value.

The power control device having Configuration 4 makes it possible to perform the charging continuously by performing control such that, if an overcurrent is detected, the charging is stopped temporarily to protect the battery and such that, after the allowable power value is calculated, the output of the conversion unit is resumed based on the calculated allowable power value.

Configuration 5. In the power control device in the embodiment, the control unit (e.g., the control unit 3 illustrated in FIG. 1, and S16—Yes and S18 illustrated in FIG. 3) accumulates consecutive number of times the current is determined to be an overcurrent equal to or higher than the threshold current, and when the accumulated number of times becomes not less than a threshold number of times, the control unit performs control such that the output of the conversion unit is error-stopped.

The power control device having Configuration 5 makes it possible that, in a case where the consecutive number of times the current is determined to be an overcurrent equal to or higher than the threshold current becomes not less than the threshold number of times, the control unit determines the case to be a case of a system abnormality of the electric power system, a failure of the power control device, or the like and performs control such that the output of the conversion unit is error-stopped.

The present embodiment can increase and decrease the charge current in accordance with the amount of power generation by the photovoltaic power generator, enabling the battery to be charged in a shorter time while avoiding the system failure.

The invention is not limited to the foregoing embodiments, and various variations/changes are possible within the spirit of the invention.

What is claimed is:

1. A power control device that can charge a battery by controlling an output of a conversion unit configured to convert a supplied grid electric power into an electric power for charging the battery, the power control device comprising:

a sensing unit configured to sense voltage and current of the supplied grid electric power;

a determination unit configured to determine whether a sensed voltage sensed by the sensing unit is in an unstable state in which the sensed voltage drops relative to a rated voltage of the supplied grid electric power;

a calculation unit configured to calculate an allowable power value to which a normal rated power of the supplied grid power is reduced based on the sensed voltage and a rated current of the supplied grid electric power in a case when the determination unit determines that the sensed voltage is in the unstable state; and a control unit configured to control the output of the conversion unit so as to perform a restricted charging in which the normal rated power of the supplied grid electric power is reduced based on the allowable power value.

2. The power control device according to claim 1, wherein the determination unit further determines whether a current in a case when the restricted charging is performed with the sensed voltage sensed in the unstable state and an electric power value of the supplied grid electric power is an overcurrent equal to or higher than a threshold current.

3. The power control device according to claim 2, wherein in a case when the determination unit determines that the current is an overcurrent equal to or higher than the threshold current, the control unit performs a control such that the output of the conversion unit is stopped until the calculation unit calculates the allowable power value.

4. The power control device according to claim 3, wherein after the calculation unit calculates the allowable power value, the control unit performs a control such that the output of the conversion unit is resumed based on the calculated allowable power value.

5. The power control device according to claim 3 wherein, the control unit accumulates a consecutive number of times when the current is determined to be an overcurrent equal to or higher than the threshold current, and when the accumulated number of times becomes not less than a threshold number of times, the control unit performs a control such that the output of the conversion unit is error-stopped.

\* \* \* \* \*